March 17, 1936. L. RICEFIELD 2,034,001
COUPLING
Original Filed Dec. 13, 1930
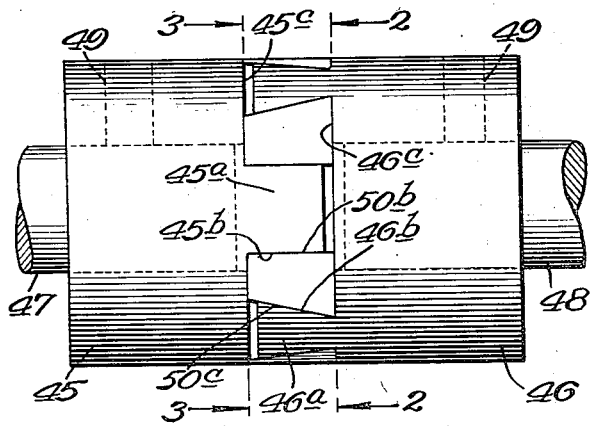
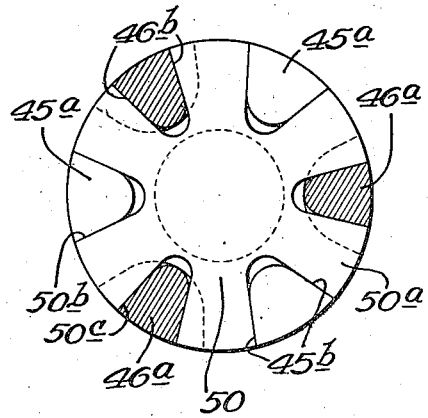
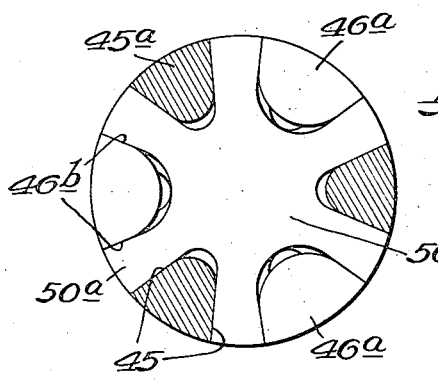
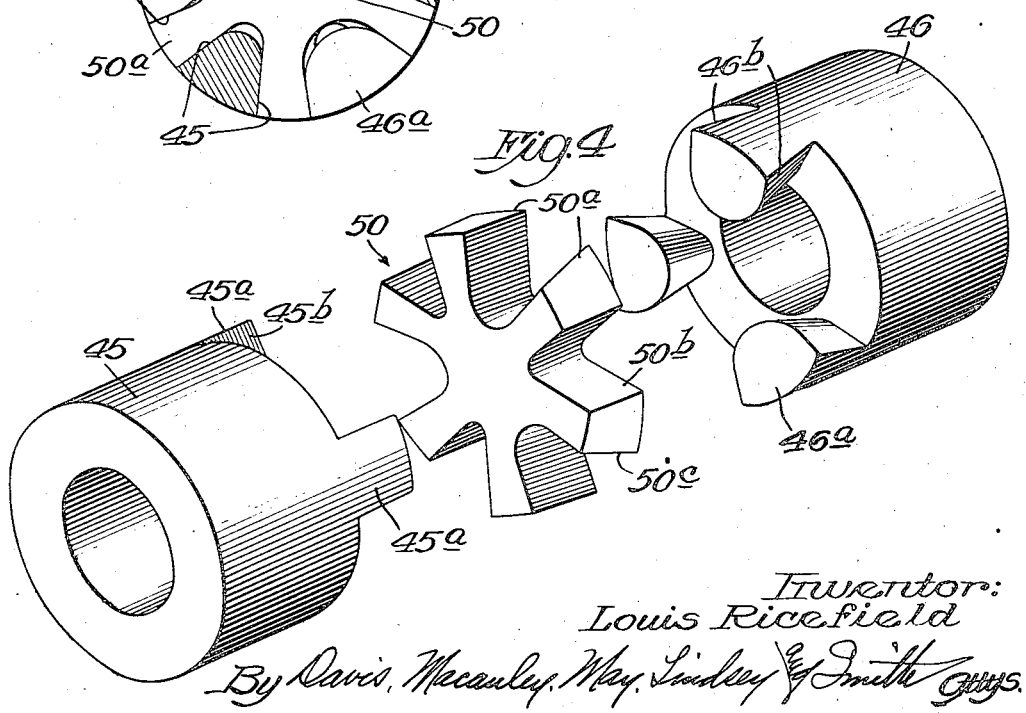
Inventor:
Louis Ricefield
By Davis, Macauley, May, Lindsey & Smith
Attys.

Patented Mar. 17, 1936

2,034,001

UNITED STATES PATENT OFFICE 2,034,001

COUPLING

Louis Ricefield, Oak Park, Ill.

Original application December 13, 1930, Serial No. 502,199. Divided and this application May 18, 1935, Serial No. 22,247

6 Claims. (Cl. 64—14)

This invention relates to improvements in couplings and its purpose is to provide an improved device for connecting substantially aligned shafts to compensate for angular misalignment of the shafts, for relative lateral displacement thereof and to permit relative end motion of said shafts during their rotation. The present application is a division of my original application Serial No. 502,199, filed December 13, 1930. The principal object of the present invention is to provide an improved coupling comprising two coupling members each of which is adapted to be secured to one of the substantially aligned shafts and each of which is provided with a plurality of longitudinally extending lugs or jaws adapted to mesh loosely with the lugs or jaws upon the other coupling member and to receive between them the radiating arms of a power transmitting spider formed preferably of resilient material, the coacting surfaces of the spider arms and jaws being such that the spider is held against endwise movement longitudinally of the shafts with respect to one coupling member while the other coupling member is permitted to move freely in said longitudinal direction so that relative endwise movement of the shafts is permitted. A further object is to provide a coupling of the type referred to in which the coacting surfaces of the coupling jaws and the spider arms are so arranged that the spider arms tend to be forced endwise of the shaft toward one coupling member while the other coupling member is free to move endwise with respect to the coacting spider. Still another object is to provide an improved coupling comprising a pair of coupling members each adapted to be secured upon one of a pair of substantially aligned shafts and each having lugs or jaws extending longitudinally to intermesh loosely with the lugs or jaws of the other coupling member, in combination with a power transmitting member having radiating arms extending between the lugs or jaws carried by opposite coupling members, each of the lugs or jaws on one coupling member having opposite spider arms engaging faces which converge endwise of the shafts toward the body of that coupling member, the lugs or jaws carried by the other coupling member having opposite spider arm engaging faces which lie in planes extending parallel to the longitudinal axes of the shafts. Other objects relate to various features of construction and arrangement which will appear more fully hereinafter.

The nature of the invention will be understood from the following specification taken with the accompanying drawing, in which one embodiment is illustrated. In the drawing, Fig. 1 shows a side elevation of a coupling embodying one form of the invention;

Fig. 2 is a detail section taken on the line 2—2 of Fig. 1;

Fig. 3 is a detail section taken on the line 3—3 of Fig. 1; and

Fig. 4 is a perspective view of the completed coupling shown in Fig. 1 with several parts thereof spaced apart and separated from each other.

In the form of the invention shown in the drawing, a pair of coupling members 45 and 46 are secured on the respective shafts 47 and 48 by means of set screws 49. The coupling member 45 has a plurality of longitudinally extending lugs 45ª which are adapted to intermesh loosely with the lugs 46ª which are formed on the other coupling member 46. The lugs 45ª have opposite surfaces 45ᵇ which converge inwardly toward the axis of the shaft 47 but which lie in planes parallel to said axis so that there is no convergence of these surfaces in either direction longitudinally of the shafts. The lugs 46ª on the other coupling member have opposite surfaces 46ᵇ which converge inwardly toward the axis of the shaft 48 but which also converge endwise toward the body of the coupling member. The surfaces 45ᵇ and 46ᵇ of the lugs carried by the coupling members are adapted to contact with the arms of an intervening spider 50 which may preferably be formed of layers of fabric impregnated with rubber and united with each other by vulcanization. This spider has a plurality of radiating arms 50ª provided with surfaces 50ᵇ and 50ᶜ on each arm to coact with two of the surfaces 45ᵇ and 46ᵇ, respectively. The spider arms are so formed that each surface 50ᵇ extends parallel to the surface 45ᵇ with which it contacts, while the other surface 50ᶜ on the same arm is inclined longitudinally of the shaft so that it conforms to the inclination of the surface 46ᵇ of the lugs engaged thereby. With this construction, the converging surfaces on the lugs 46ª of one coupling member tend to oppose relative endwise movement of that coupling member but, since the surfaces 45ᵇ on opposite sides of the lugs of the other coupling member extend parallel to the axes of the shafts, although converging inwardly on each lug, the other coupling member is permitted to have a free endwise movement longitudinally of the shafts. This will permit a free floating movement of both of the connected shafts while restraining the spider against endwise movement with respect to one coupling member. As in the forms of the invention disclosed in my above mentioned original application, the dimensions of the arms of the spider measured longitudinally of the shafts are such that when they engage the end surfaces 45$^b$ and 46$^b$ of the coupling members, the ends of the lugs 45$^a$ and 46$^a$ are spaced from the end surfaces 46$^c$ and 45$^c$, respectively, as shown in Fig. 1, so that the coupling members 45 and 46 are prevented from abutting against each other when relative endwise movement occurs.

Although one form of the invention has been shown and described by way of illustration, it will be understood that it may be constructed in various other embodiments coming within the scope of the appended claims.

I claim:

1. The combination in a coupling for connecting substantially aligned shafts, of a pair of coupling members each adapted to be secured to one of said shafts, each of said coupling members being provided with a plurality of longitudinally extending jaws adapted to intermesh loosely with the jaws carried by the other coupling member, and a spider interposed between said coupling members and having radiating arms each adapted to extend between two of said jaws carried by opposite coupling members, each of said jaws carried by one of said coupling members having opposite spider engaging surfaces converging endwise toward the body of the coupling member to which it is attached, each of said jaws carried by the other coupling member having opposite spider engaging surfaces which extend parallel to the axis of said shafts, each of said spider arms having opposite jaw-engaging surfaces which are arranged to conform to the surfaces of two of said jaws carried by opposite coupling members.

2. The combination in a coupling for connecting substantially aligned shafts, of a pair of coupling members each adapted to be secured to one of said shafts, each of said coupling members being provided with a plurality of longitudinally extending jaws adapted to intermesh loosely with the jaws carried by the other coupling members, and a spider interposed between said coupling members and having radiating arms adapted to extend between and contact with two of said jaws carried by opposite coupling members, each of said jaws carried by one of said coupling members having opposite spider-engaging surfaces diverging endwise away from the body of the coupling member to which it is attached, each of said jaws carried by the other coupling member having opposite spider engaging surfaces, the longitudinal lines of which extend parallel to the axis of said shafts.

3. The combination in a coupling for connecting substantially aligned shafts, of a pair of coupling members each adapted to be secured to one of said shafts, each of said coupling members being provided with a plurality of longitudinally extending jaws adapted to intermesh loosely with the jaws carried by the other coupling member, and a spider interposed between said coupling members and having radiating arms of resilient material adapted to extend between and contact with two of said jaws carried by opposite coupling members, each of said jaws carried by one of said coupling members having opposite spider engaging surfaces diverging endwise away from the body of the coupling member to which it is attached, each of said jaws carried by the other coupling member having opposite spider-engaging surfaces, the longitudinal lines of which extend parallel to the axis of said shafts.

4. The combination in a coupling for connecting substantially aligned shafts, of a pair of coupling members each adapted to be secured to one of said shafts, each of said coupling members being provided with a plurality of longitudinally extending jaws adapted to intermesh loosely with the jaws carried by the other coupling member, and a spider interposed between said coupling members and having radiating arms adapted to extend between and contact with two of said jaws carried by opposite coupling members, said spider arms and the jaws carried by one coupling member having coacting surfaces adapted to hold the spider against endwise movement longitudinally of the shafts with respect to that coupling member, the spider arms and the jaws of the other coupling member having coacting surfaces adapted to permit free endwise movement of the other coupling member longitudinally of the shafts.

5. The combination in a coupling for connecting substantially aligned shafts, of a pair of coupling members each adapted to be secured to one of said shafts, each of said coupling members being provided with a plurality of jaws adapted to intermesh loosely with the jaws carried by the other coupling member, and a spider interposed between said coupling members and having radiating arms adapted to extend between and contact with two of said jaws carried by opposite coupling members, said spider arms and the jaws carried by one coupling member having coacting surfaces adapted to hold the spider against endwise movement longitudinally of the shafts with respect to that coupling member, the spider arms and the jaws of the other coupling member having coacting surfaces adapted to permit free endwise movement of the other coupling member longitudinally of the shafts.

6. The combination in a coupling for connecting substantially aligned shafts, of a pair of coupling members each adapted to be secured to one of said shafts, each of said coupling members being provided with a plurality of jaws adapted to intermesh loosely with the jaws carried by the other coupling member, and a spider interposed between said coupling members and having radiating arms adapted to extend between and contact with two of said jaws carried by opposite coupling members, each of said jaws carried by one of said coupling members having opposite spider-engaging surfaces diverging endwise away from the body of the coupling member to which it is attached, each of said jaws carried by the other coupling member having opposite spider engaging surfaces, the longitudinal lines of which extend parallel to the axis of said shafts.

LOUIS RICEFIELD.